(12) United States Patent
Seidel et al.

(10) Patent No.: US 6,762,228 B2
(45) Date of Patent: Jul. 13, 2004

(54) FLAME-RESISTANT, MINERAL-REINFORCED POLYCARBONATE COMPOSITIONS WITH A HIGH FLOW LINE STRENGTH

(75) Inventors: Andreas Seidel, Dormagen (DE); Thomas Eckel, Dormagen (DE); Uwe Peucker, Coelbe (DE); Dieter Wittmann, Leverkusen (DE)

(73) Assignee: Bayer Aktiengesellschaft, Leverkusen (DE)

(*) Notice: Subject to any disclaimer, the term of this patent is extended or adjusted under 35 U.S.C. 154(b) by 70 days.

(21) Appl. No.: 10/054,269

(22) Filed: Jan. 22, 2002

(65) Prior Publication Data

US 2002/0137822 A1 Sep. 26, 2002

(30) Foreign Application Priority Data

Jan. 25, 2001 (DE) .......................................... 10103238

(51) Int. Cl.$^7$ ............................ C08K 5/521; C08K 3/34
(52) U.S. Cl. ....................... 524/127; 524/140; 524/141; 524/145; 524/456
(58) Field of Search ............................... 524/127, 140, 524/141, 145, 456

(56) References Cited

U.S. PATENT DOCUMENTS

| | | | |
|---|---|---|---|
| 5,091,461 A | 2/1992 | Skochdopole | 524/493 |
| 5,961,915 A | 10/1999 | Toyouchi et al. | 264/572 |
| 5,965,655 A | 10/1999 | Mordecai et al. | 524/456 |
| 6,174,943 B1 | 1/2001 | Matsumoto et al. | 524/115 |
| 6,362,269 B1 * | 3/2002 | Ishihata et al. | 524/449 |
| 6,403,683 B1 * | 6/2002 | Kobayashi | 524/115 |

FOREIGN PATENT DOCUMENTS

| | | |
|---|---|---|
| EP | 1 026 205 A1 | 8/2000 |
| EP | 1 038 920 | 9/2000 |
| WO | 98/51737 | 11/1998 |
| WO | 00/46298 | 8/2000 |

OTHER PUBLICATIONS

Patent Abstracts of Japan vol. 2000, No. 05, Sep. 14, 2000 & JP 2000 063654 A (Otsuka Chem Co Ltd), Feb. 29, 2000 das ganze dokument.

* cited by examiner

*Primary Examiner*—Peter Szekely
(74) *Attorney, Agent, or Firm*—Joseph C. Gil; Aron Preis; James R. Franks

(57) ABSTRACT

An impact-resistant modified, flame-resistant and mineral-reinforced polycarbonate composition is disclosed. The composition has a flow line strength of greater than 6 kJ/m$^2$ measured according to ISO 179/IeU and is preferably reinforced with wollastonite.

7 Claims, No Drawings

FLAME-RESISTANT, MINERAL-REINFORCED POLYCARBONATE COMPOSITIONS WITH A HIGH FLOW LINE STRENGTH

FIELD OF THE INVENTION

The invention relates to thermoplastic molding compositions and more particularly to compositions containing polycarbonate.

BACKGROUND OF THE INVENTION

The present invention relates to flame-resistant, mineral-reinforced polycarbonate compositions with a high modulus of elasticity, good thermal resistance, excellent processing behavior and with improved flow line strength.

EP-A 0 391 413 disclosed PC/ABS (polycarbonate and acrylonitrile/butadiene/styrene) compositions having a low linear coefficient of thermal expansion as well as a high impact strength and thermal stability. These contain 4 to 18 wt. % of an inorganic filler whose particles have a mean diameter/thickness ratio of 4 to 24. The inorganic filler is a lamellar material such as talcum and mica. The described molding compositions are not flame-resistant.

EP-A 0 754 531 describes, inter alia, PC/ABS compositions that are rendered flame-resistant with an oligophosphate derived from bisphenol A and that contain lamellar reinforcing agents. WO 00/46298 describes PC/ABS blends rendered flame-resistant with organophosporus compounds and that contain 0.1 to 5 parts by weight of talcum.

Molding compositions with lamellar fillers as described in the aforementioned documents generally have an unsatisfactory flow line strength.

Also known are PC/ABS molding compositions with fiber-like mineral fillers. U.S. Pat. No. 5,965,655 describes PC/ABS compositions containing wollastonite that are characterized in particular by improved surface characteristics and that have a so-called Class A surface. The preferably used wollastonites have a mean aspect ratio, i.e. a ratio of fiber length to fiber diameter, of up to 6. Molding compositions containing such wollastonites are as a rule insufficiently rigid, i.e. have too low a tensile/flexural modulus. The described molding compositions have not been rendered flame-resistant.

Also, the PC/ABS molding compositions of WO 98/51737, which are characterized by improved thermal stability, flowability, low temperature strength and dimensional stability, are not flame-resistant. The compositions disclosed there contain 1 to 15 parts by weight of a mineral filler such as talcum or wollastonite having a mean largest particle size of 0.1 to 30 µm. In the case of fiber-like fillers such as wollastonite having a large aspect ratio, this limit is as a rule exceeded. The molding compositions of EP-A 1 038 920 contained a special melt polycarbonate, ABS and 5 to 200 parts by weight of a reinforcing filler have also not been rendered flame-resistant.

In EP-A 1 026 205 flame-resistant PC/ABS compositions with a low chlorine content are described, that contain 0.1 to 30 parts by weight of a silicate filler and that are characterized in particular by an outstanding resistance to hydrolysis. As filler there may be used talcum and mica, as well as wollastonite. The described molding compositions have an unsatisfactory flame resistance, thermal stability, too poor an ESC behavior, and in injection molding may lead to undesirable coatings on the tool due to bleeding of the flame-proofing additive (so-called juicing). This also applies to the PC/ABS molding compositions described in JP-A 11/199768, which contain only 0.5 to 5 wt. % of an inorganic filler and for this reason exhibit a rigidity that is inadequate for many applications.

The object of the present invention is accordingly to provide mineral-reinforced flame-resistant polycarbonate compositions that are characterized by an excellent flame resistance, especially also in the case of thin wall thicknesses, high rigidity, good thermal stability, toughness and an excellent processing behavior, i.e. by good flowability and extremely low tendency to form coatings on the tool surfaces during the injection molding processing, and by an outstanding ESC (environmental stress cracking) behavior as well as, in particular, a significantly improved flow line strength. Such molding compositions may be used to produce all types of molded parts, in particular thin-walled parts that have to satisfy stringent requirements as regards mechanical properties and flame-proofing.

DETAILED DESCRIPTION OF THE INVENTION

This object is achieved by impact-resistant modified, mineral-reinforced polycarbonate compositions rendered flame-resistant and having a flow line strength of >6 kJ/m$^2$, measured according to ISO 179/1eU. The present invention also provides molded articles containing this polycarbonate composition. In a preferred embodiment the polycarbonate compositions according to the invention have a modulus of elasticity of $\geq 3.5$ GPa.

Particularly preferably the compositions according to the invention achieve a rating of V-0 in the flame-resistance test according to UL94-V with wall thicknesses of $\leq 1.5$ mm, preferably $\leq 1.2$ mm, in particular $\leq 1.0$ mm.

As reinforcing mineral the compositions according to the invention contain wollastonite with an average aspect ratio of preferably >10, particularly preferably >15. The aspect ratio denotes the ratio between the largest and smallest dimensions of a particle. In the case of fiber-like particles such as wollastonite, this is the ratio of their average length to their average diameter. The wollastonites used according to the invention may have average fiber diameters of less than 15 µm, preferably $\leq 10$ µm. The wollastonite to be used according to the invention may be used in the polycarbonate compositions in an amount of 1 to 30 parts by weight, preferably 5 to 20 parts by weight, and particularly preferably 8 to 15 parts by weight.

Wollastonite is a calcium silicate with the ideal empirical formula $Ca_3[Si_3O_9]$ and forms generally compact, fibrous, columnar, foliate or fine-fiber masses, and in some cases also tabular to needle-shaped crystals. A very wide range of types is commercially available. This is also true of the wollastonite to be used according to the invention.

It has surprisingly been found that polycarbonate compositions containing wollastonite having the specified aspect ratio exhibit the desired properties, and in particular possess a high flow line strength and a high modulus of elasticity. This is surprising since talcum with the corresponding aspect ratio, likewise being a silicate reinforcing agent, significantly reduces the flow line strength of PC/ABS molding compositions.

The desired property spectrum according to the invention may be achieved according to a preferred embodiment of the invention by a polycarbonate composition that contains, in addition to the selected wollastonite, also the following components:

A) an aromatic polycarbonate and/or polyester carbonate,
B) an impact resistance modifier,
C) optionally a thermoplastic homopolymer and/or copolymer, and
D) a phosphorus compound, preferably an oligophosphate derived from bisphenol compounds,
E) optionally a fluorinated polyolefin and in addition may contain further additives.

The suitable components according to the invention of the impact-resistant modified, flame-resistant, mineral-reinforced polycarbonate compositions are illustrated hereinafter by way of example.

Component A

Suitable aromatic polycarbonates and/or aromatic polyester carbonates of component A according to the invention are known in the literature or can be produced by methods known in the literature (for the production of aromatic polycarbonates see for example Schnell, "Chemistry and Physics of Polycarbonates", Interscience Publishers, 1964, as well as DE-AS 1 495 626, DE-A 2 232 877, DE-A 2 703 376, DE-A 2 714 544, DE-A 3 000 610, DE-A 3 832 396; for the production of aromatic polyester carbonates see for example DE-A 3 077 934).

The production of aromatic polycarbonates is carried out for example by reacting diphenols with carbonic acid halides, preferably phosgene and/or with aromatic dicarboxylic acid dihalides, preferably benzenedicarboxylic acid dihalides, by the phase boundary process, optionally with the use of chain terminators, for example monophenols, and optionally with the use of trifunctional or more than trifunctional branching agents, for example triphenols or tetraphenols.

Diphenols for the production of the aromatic polycarbonates and/or aromatic polyester carbonates are preferably those of the formula (I):

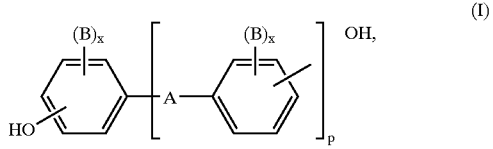

wherein

A denotes a single bond, $C_1$–$C_5$ alkylene, $C_2$–$C_5$ alkylidene, $C_5$–$C_6$ cycloalkylidene, —O—, —SO—, —CO—, —S—, —$SO_2$—, $C_6$–$C_{12}$ arylene, which may be condensed with further aromatic rings optionally containing heteroatoms, or a radical of the formula (II) or (III):

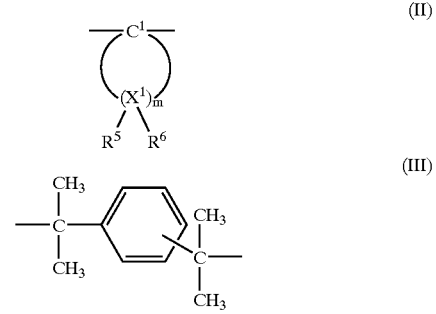

B in each case denotes $C_1$–$C_{12}$ alkyl, preferably methyl, halogen, preferably chlorine and/or bromine, x independently of one another denotes 0, 1 or 2,
p is 0 or 1, and
$R^5$ and $R^6$ may be chosen individually for each $X^1$, and independently of one another denote hydrogen or $C_1$–$C_6$ alkyl, preferably hydrogen, methyl or ethyl,
$X^1$ is carbon, and
m is an integer from 4 to 7, preferably 4 or 5, with the proviso that on at least one atom $X^1$, $R^5$ and $R^6$ are both simultaneously alkyl.

Preferred diphenols are hydroquinone, resorcinol, dihydroxydiphenols, bis-(hydroxyphenyl)-$C_1$–$C_5$-alkanes, bis-(hydroxyphenyl)-$C_5$–$C_6$-cycloalkanes, bis-(hydroxyphenyl)-ethers, bis-(hydroxyphenyl)-sulfoxides, bis-(hydroxyphenyl)-ketones, bis-(hydroxyphenyl)-sulfones, and α,α-bis-(hydroxyphenyl)-diisopropylbenzenes as well as their nuclear-brominated and/or nuclear-chlorinated derivatives Particularly preferred diphenols are 4,4'-dihydroxydiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxydiphenyl sulfide, 4,4'-dihydroxydiphenyl sulfone as well as their dibrominated and tetrabrominated and chlorinated derivatives, such as for example 2,2-bis-(3-chloro-4-hydroxyphenyl)propane, 2,2-bis-(3,5-dichloro-4-hydroxyphenyl)propane or 2,2-bis-(3,5-dibromo-4-hydroxyphenyl)propane. 2,2-bis-(4-hydroxyphenyl)propane (bisphenol A) is particularly preferred.

The diphenols may be used individually or as arbitrary mixtures. The diphenols are known in the literature or can be obtained by processes known in the literature.

Suitable chain terminators for the production of the thermoplastic, aromatic polycarbonates include for example phenol, p-chlorophenol, p-tert.-butylphenol or 2,4,6-tribromophenol, as well as long-chain alkylphenols such as 4-(1,3-tetramethylbutyl)phenol according to DE-A 2 842 005, or monoalkylphenols or dialkylphenols with a total of 8 to 20 carbon atoms in the alkyl substituents, such as 3,5-di-tert.-butylphenol, p-iso-octylphenol, p-tert.-octylphenol, p-dodecylphenol, and 2-(3,5-dimethylheptyl) phenol and 4-(3,5-dimethylheptyl)phenol. The amount of chain terminators used is generally between 0.5 mole % and 10 mole %, referred to the molar sum of the diphenols used in each case.

The thermoplastic aromatic polycarbonates have mean, weight average molecular weights ($M_w$, measured for example by ultracentrifugation or light-scattering measurements) of 10,000 to 200,000, preferably 15,000 to 80,000.

The thermoplastic, aromatic polycarbonates may be branched in a manner known per se, and more specifically preferably by the incorporation of 0.05 to 2.0 mole %, referred to the sum of the diphenols used, of trifunctional or more than trifunctional compounds, for example those with three or more than three phenolic groups.

Homopolycarbonates as well as copolycarbonates are suitable. For the production of copolycarbonates according to the invention, as component A there may also be used 1 to 25wt. %, preferably 2.5 to 25 wt. % (referred to the total amount of diphenols used) of polydiorganosiloxanes with hydroxy-aryloxy terminal groups. These are known (see for example U.S. Pat. No. 3,419,634) and can be produced by methods known in the literature. The production of polydiorganosiloxane-containing copolycarbonates is described for example in DE-A 3 334 782.

Preferred polycarbonates include, in addition to bisphenol A homopolycarbonates, also the copolycarbonates of bisphenol A with up to 15 mole %, referred to the molar sums of diphenols, of diphenols other than preferred and/or particularly preferred diphenols, especially up to 15 mole % of 2,2-bis(3,5-dibromo-4-hydroxyphenyl)propane.

Aromatic dicarboxylic acid dihalides for the production of aromatic polyester carbonates are preferably the diacid dichlorides of isophthalic acid, terephthalic acid, diphenylether-4,4'-dicarboxylic acid and naphthalene-2,6-dicarboxylic acid.

Particularly preferred are mixtures of the diacid dichlorides of isophthalic acid and terephthalic acid in a ratio of between 1:20 and 20:1.

In the production of polyester carbonates a carbonic acid halide, preferably phosgene, is in addition co-used as bifunctional acid derivative.

Suitable chain terminators for the production of the aromatic polyester carbonates include, apart from the already mentioned monophenols, also their chlorinated carbonic acid esters as well as the acid chlorides of aromatic monocarboxylic acids, which may optionally be substituted by $C_1$–$C_{22}$ alkyl groups or by halogen atoms, as well as aliphatic $C_2$–$C_{22}$ monocarboxylic acid chlorides.

The amount of chain terminators is in each case 0.1 to 10 mole %, referred in the case of phenolic chain terminators to mole of diphenol, and in the case of monocarboxylic acid chloride chain terminators to mole of dicarboxylic acid dichloride.

The aromatic polyester carbonates may also include incorporated aromatic hydroxycarboxylic acids.

The aromatic polyester carbonates may be linear as well as branched in a manner known per se (see in this connection also DE-A 2 940 024 and DE-A 3 007 934).

As branching agents there may be used for example trifunctional or polyfunctional carboxylic acid chlorides such as trimesic acid trichloride, cyanuric acid trichloride, 3,3'-4,4'-benzophenone tetracarboxylic acid tetrachloride, 1,4,5,8-naphthalene-tetracarboxylic acid tetrachloride or pyromellitic acid tetrachloride in amounts of 0.01 to 1.0 mole % (referred to the dicarboxylic acid dichlorides that are used), or trifunctional or polyfunctional phenols such as phloroglucinol, 4,6-dimethyl-2,4,6-tri-(4-hydroxyphenyl)-heptene-2,4,4-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis-(4-hydroxyphenyl)-cyclohexyl]-propane, 2,4-bis-(4-hydroxyphenylisopropyl)-phenol, tetra-(4-hydroxyphenyl)-methane, 2,6-bis-(2-hydroxy-5-methylbenzyl)-4-methylphenol, 2-(4-hydroxyphenyl)-2-(2,4-dihydroxyphenyly)-propane, tetra-(4-[4-hydroxyphenylisopropyl]-phenoxy)-methane, 1,4-bis-[4,4'-dihydroxytriphenyl)-methyl]-benzene, in amounts of 0.01 to 1.0 mole %, referred to the diphenols that are used. Phenolic branching agents may be added together with the diphenols, while acid chloride branching agents may be added together with the acid dichlorides.

In the thermoplastic, aromatic polyester carbonates the proportion of carbonate structural units may be varied as desired. Preferably the proportion of carbonate groups is up to 100 mole %, in particular up to 80 mole %, particularly preferably up to 50 mole %, referred to the sum total of ester groups and carbonate groups. The ester fraction as well as the carbonate fraction of the aromatic polyester carbonates may be present in the form of blocks or may be statistically distributed in the polycondensate.

The relative solution viscosity ($\eta_{rel.}$) of the aromatic polycarbonates and polyester carbonates is in the range 1.18 to 1.4, preferably 1.20 to 1.32 (measured in solutions containing 0.5 g of polycarbonate or polyester carbonate in 100 ml of methylene chloride solution at 25° C.).

The thermoplastic, aromatic polycarbonates and polyester carbonates may be used alone or in mixtures with one another.

The component A may be contained in the compositions according to the invention in an amount of preferably 5 to 95 parts by weight, particularly preferably 10 to 90 parts by weight, and most particularly preferably 50 to 85 parts by weight.

Component B

The component B comprises one or more graft polymers of

B.1 5 to 95 wt. %, preferably 30 to 90 wt. %, of at least one vinyl monomer on

B.2 95 to 5 wt. %, preferably 70 to 10 wt. %, of one or more graft bases having glass transition temperatures of <10° C., preferably <0° C., particularly preferably <−20° C.

The graft base B.2 generally has a mean particle size ($d_{50}$ value) of 0.05 to 10 μm, preferably 0.1 to 5 μm, particularly preferably 0.2 to 1 μm.

Monomers B.1 are Preferably Mixtures of

B.1.1 50 to 99 parts by weight of vinyl aromatic compounds and/or nuclear-substituted vinyl aromatic compounds (such as for example styrene, α-methylstyrene, p-methylstyrene, p-chlorostyrene) and/or methacrylic acid ($C_1$–$C_8$) alkyl esters (such as methyl methacrylate, ethyl methacrylate) and B.1.2 1 to 50 parts by weight of vinyl cyanides (unsaturated nitrites such as acrylonitrile and methacrylonitrile) and/or (meth)acrylic acid ($C_1$–$C_8$) alkyl esters (such as methyl methacrylate, n-butyl acrylate, tert.-butyl acrylate) and/or derivatives (such as anhydrides and imides) of unsaturated carboxylic acids (for example maleic anhydride and N-phenylmaleimide).

Preferred monomers B.1.1 are at least one of the monomers selected from among styrene, α-methylstyrene and methyl methacrylate, and preferred monomers B.1.2 are at least one of the monomers selected from among acrylonitrile, maleic anhydride and methyl methacrylate.

Particularly preferred monomers are B.1.1 styrene and B.1.2 acrylonitrile.

For the graft polymers B suitable graft bases B.2 are for example diene rubbers, EP(D)M rubbers, i.e. those based on ethylene/propylene and optionally diene, acrylate, polyurethane, silicone, chloroprene and ethylene/vinyl acetate rubbers.

Preferred graft bases B.2 are diene rubbers (for example based on butadiene, isoprene) or mixtures of diene rubbers or copolymers of diene rubbers or their mixtures with further copolymerizable monomers (e.g. according to B.1.1 and B.1.2), with the proviso that the glass transition temperature of the component B.2 is below 10° C., preferably below 0° C., particularly preferably below −10° C. Pure polybutadiene rubber is particularly preferred.

Particularly preferred polymers B are for example ABS polymers (emulsion, bulk and suspension ABS), such as are described for example in DE-A 2 035 390 (=U.S. Pat. No. 3,644,574) or in DE-A 2 248 242 (=GB-B 1 409 275) or in Ullmanns, Enzyklopädie der Technischen Chemie, Vol. 19 (1980), p. 280 et seq. The gel content of the graft base B.2 is at least 30 wt. %, preferably at least 40 wt. % (measured in toluene).

The graft copolymers B may be produced by free-radical polymerisation, e.g. by emulsion, suspension, solution or bulk polymerisation, preferably by emulsion or bulk polymerisation.

Particularly suitable graft rubbers are ABS polymers that are produced by redox initiation with an initiator system of organic hydroperoxide and ascorbic acid according to U.S. Pat. No. 4,937,285.

Since in the graft reaction the graft monomers are not, as is known, necessarily completely grafted onto the graft base, according to the invention the expression graft polymers B is also understood to include those products that are obtained by (co)polymerisation of the graft monomers in the presence of the graft base and that occur with it during the working-up.

Suitable acrylate rubbers according to B.2 of the polymers B are preferably polymers of acrylic acid alkyl esters, optionally with up to 40 wt. %, referred to B.2, of other polymerisable, ethylenically unsaturated monomers. The preferred polymerisable acrylic acid esters include $C_1$–$C_8$ alkyl esters, for example methyl, ethyl, butyl, n-octyl and 2-ethylhexyl esters; halogenated alkyl esters, preferably halogenated-$C_1$–C8-alkyl esters such as chloroethyl acrylate, as well as mixtures of these monomers.

Monomers with more than one polymerizable double bond may be co-polymerised for the crosslinking. Preferred examples of crosslinking monomers are esters of unsaturated monocarboxylic acids with 3 to 8 C atoms and unsaturated monohydric alcohols with 3 to 12 C atoms or saturated polyols with 2 to 4 OH groups and 2 to 20 C atoms, such as ethylene glycol dimethacrylate, allyl methacrylate; multiply unsaturated heterocyclic compounds, such as trivinyl cyanurate and triallyl cyanurate; polyfunctional vinyl compounds such as divinylbenzenes and trivinylbenzenes; as well as triallyl phosphate and diallyl phthalate.

Preferred crosslinking monomers include allyl methacrylate, ethylene glycol dimethacrylate, diallyl phthalate and heterocyclic compounds that contain at least three ethylenically unsaturated groups.

Particularly preferred crosslinking monomers are the cyclic monomers triallyl cyanurate, triallyl isocyanurate, triacryloylhexahydro-s-triazine, and triallylbenzenes. The amount of the crosslinking monomers is preferably 0.02 to 5 wt. %, in particular 0.05 to 2 wt. %, referred to the graft base B.2.

In the case of cyclic crosslinking monomers containing at least three ethylenically unsaturated groups, it is advantageous to restrict the amount to below 1 wt. % of the graft base B.2.

Preferred "other" polymerizable ethylenically unsaturated monomers that in addition to the acrylic acid esters may optionally serve for the production of the graft base B.2 include for example acrylonitrile, styrene, α-methylstyrene, acrylamides, vinyl $C_1$–$C_6$ alkyl ethers, methyl methacrylate, and butadiene. Preferred acrylate rubbers as graft base B.2 are emulsion polymers that have a gel content of at least 60 wt. %.

Further suitable graft bases according to B.2 are silicone rubbers with graft-active sites, such as are described in DE-A 3 704 657, DE-A 3 704 655, DE-A 3 631 540 and DE-A 3 631 539.

The gel content of the graft base B.2 is measured at 25° C. in a suitable solvent (M. Hoffmann, H. Krömer, R. Kuhn, Polymeranalysis I and II, Georg Thieme-Verlag, Stuttgart 1977).

The mean particle diameter $d_{50}$ is the diameter above and below which in each case 50 wt. % of the particles lie, and may be determined by means of ultracentrifuge measurements (W. Scholtan, H. Lange, Kolloid, Z. and Z. Polymere 250 (1972), 782–796).

The component B may be contained in the compositions according to the invention in an amount of preferably 0.5 to 60 parts by weight, particularly preferably 1 to 40 parts by weight, and most particularly preferably 2 to 30 parts by weight.

Component C

The component C comprises one or more thermoplastic vinyl (co)polymers C.1 and/or polyalkylene terephthalates C.2.

Suitable as vinyl (co)polymers C.1 are polymers of at least one monomer from the group that includes vinyl aromatic compounds, vinyl cyanides (unsaturated nitriles), (meth)acrylic acid ($C_1$–$C_8$) alkyl esters, unsaturated carboxylic acids as well as derivatives (such as anhydrides and imides) of unsaturated carboxylic acids. Particularly suitable are (co)polymers of C.1.1 50 to 99 parts by weight, preferably 60 to 80 parts by weight of vinyl aromatic compounds and/or nuclear-substituted vinyl aromatic compounds (such as for example styrene, α-methylstyrene, p-methylstyrene, p-chlorostyrene) and/or methacrylic acid ($C_1$–$C_8$) alkyl esters (such as for example methyl methacrylate, ethyl methacrylate), and C.1.2 1 to 50 parts by weight, preferably 20 to 40 parts by weight of vinyl cyanides (unsaturated nitriles) such as acrylonitrile and methacrylonitrile and/or (meth)acrylic acid ($C_1$–$C_8$) alkyl esters (such as methyl methacrylate, n-butyl acrylate, t-butyl acrylate) and/or unsaturated carboxylic acids (such as maleic acid) and/or derivatives (such as anhydrides and imides) of unsaturated carboxylic acids (for example maleic anhydride and N-phenylmaleimide).

The (co)polymers C.1 are resin-like, thermoplastic and rubber-free. Particularly preferred is the copolymer of C,1.1 styrene and C.1.2 acrylonitrile.

The (co)polymers according to C.1 are known and can be produced by free-radical polymerisation, in particular by emulsion, suspension, solution or bulk polymerisation. The (co)polymers preferably have mean molecular weights $M_w$ (weight average, determined by light scattering or sedimentation) of between 15,000 and 200,000.

The polyalkylene terephthalates of the component C.2 are reaction products of aromatic dicarboxylic acids or their reactive derivatives, such as dimethyl esters or anhydrides, and aliphatic, cycloaliphatic or araliphatic diols as well as mixtures of these reaction products.

Preferred polyalkylene terephthalates contain at least 80 wt. %, preferably at least 90 wt. %, referred to the dicarboxylic acid component, of terephthalic acid radicals, and at least 80 wt. %, preferably at least 90 mole %, referred to the diol component, of ethylene glycol radicals and/or butanediol-1,4 radicals.

The preferred polyalkylene terephthalates may contain, in addition to terephthalic acid radicals, also up to 20 mole %, preferably up to 10 mole %, of radicals of other aromatic or cycloaliphatic dicarboxylic acids with 8 to 14 C atoms or aliphatic dicarboxylic acids with 4 to 12 C atoms, such as radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred polyalkylene terephthalates may contain, in addition to ethylene glycol radicals or butanediol-1,4 radicals, also up to 20 mole %, preferably up to 10 mole %, of other aliphatic diols with 3 to 12 C atoms or cycloaliphatic diols with 6 to 21 C atoms, for example radicals of propanediol-1,3, 2-ethylpropanediol-1,3, neo-pentyl glycol, pentanediol-1,5, hexanediol-1,6, cyclohexanedimethanol-1,4, 3-ethylpentanediol-2,4, 2-methylpentanediol-2,4, 2,2,4-trimethylpentanediol-1,3, 2-ethylhexanediol-1,3, 2,2-diethylpropanediol-1,3, hexanediol-2,5, 1,4-di-(β-hydroxyethoxy)-benzene, 2,2-bis-(4-hydroxycyclohexyl)-propane, 2,4-dihydroxy-1,1,3,3-tetramethylcyclobutane, 2,2-bis-(4-β-hydroxyethoxyphenyl)-propane and 2,2-bis-(4-hydroxypropoxyphenyl)-propane (DE-A 2 407 674, 2 407 776, 2 715 932).

The polyalkylene terephthalates may be branched by incorporating relatively small amounts of trihydric or tetrahydric alcohols or tribasic or tetrabasic carboxylic acids, for example according to DE-A 1 900 270 and U.S. Pat. No. 3,692,744. Examples of preferred branching agents are trimesic acid, trimellitic acid, trimethylolethane and trimethylolpropane, and pentaerythritol.

Particularly preferred are polyalkylene terephthalates that have been produced simply from terephthalic acid and its reactive derivatives (for example its dialkyl esters) and ethylene glycol and/or butanediol-1,4, and mixtures of these polyalkylene terephthalates.

Mixtures of polyalkylene terephthalates contain 1 to 50 wt. %, preferably 1 to 30 wt. %, of polyethylene terephthalate, and 50 to 99 wt. %, preferably 70 to 99 wt. %, of polybutylene terephthalate.

The polyalkylene terephthalates that are preferably used generally have an intrinsic viscosity of 0.4 to 1.5 dl/g, preferably 0.5 to 1.2 dl/g, measured in phenol/o-dichlorobenzene (1:1 parts by weight) at 25° C. in an Ubbelohde viscosimeter.

The polyalkylene terephthalates may be produced by methods known per se (see for example Kunststoff-Hanbuch, Vol. VIII, p. 695 et seq, Carl-Hanser-Verlag, Munich 1973).

The component -C may be contained in the compositions according to the invention in an amount of preferably 0 to 50 parts by weight, particularly preferably up to 30 parts by weight, and most particularly preferably up to 20 parts by weight. ps Component D The compositions are rendered flame-resistant by the addition of phosphorus-containing compounds of low volatility.

Preferably the compositions contain phosphorus-containing flame-proofing agents from the groups comprising oligomeric phosphoric and phosphonic acid esters, phosphonate amines and phosphazenes, wherein mixtures of several components selected from one or various of these groups may also be used as flame-proofing agents.

Preferred oligomeric phosphoric and/or phosphonic acid esters are phosphorus compounds of the general formula (IV):

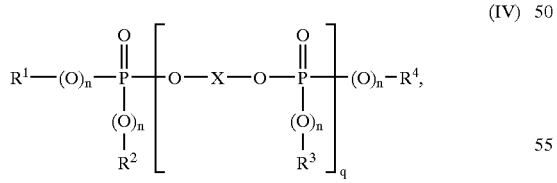

(IV)

wherein
R$^1$, R$^2$, R$^3$ and R$^4$, independently of one another in each case denote optionally halogenated C$_1$–C$_8$ alkyl, C$_5$ to C$_6$ cycloalkyl, C$_6$ to C$_{20}$ aryl or C$_7$ to C$_{12}$ aralkyl in each case optionally substituted by alkyl, preferably C$_1$ to C$_4$ alkyl, and/or halogen, preferably chlorine or bromine, n independently of one another is 0 or 1, preferably 1, q is a number from 0.5 to 30, preferably 0.7 to 15, in particular 0.9 to 5, and X denotes a mononuclear or polynuclear aromatic radical with 6 to 30 C atoms, or a linear or branched aliphatic radical with 2 to 30 C atoms, which may be OH-substituted and may contain up to 8 ether bonds.

When using mixtures of different components of the formula (IV), q adopts a number averaged value and therefore represents an average value.

Preferably R$^1$, R$^2$, R$^3$ and R$^4$ independently of one another denote C$_1$–C$_4$ alkyl, phenyl, naphthyl or phenyl-C$_1$–C$_4$-alkyl. The aromatic groups R$^1$, R$^2$, R$^3$ and R$^4$ may in turn be substituted by halogen and/or alkyl groups, preferably chlorine, bromine and/or C$_1$–C$_4$ alkyl. Particularly preferred aryl radicals are cresyl, phenyl, xylenyl, propylphenyl or butylphenyl, as well as the corresponding brominated and chlorinated derivatives thereof.

X in the formula (IV) preferably denotes a radical of the formula:

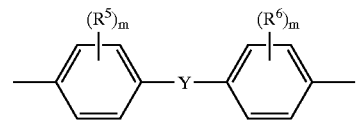

wherein
R$^5$ and R$^6$ independently of one another denote C$_1$ to C$_5$ alkyl, preferably methyl or halogen, preferably chlorine or bromine, m is an integer from 0 to 4, and Y denotes C$_1$ to C$_7$ alkylidene, C$_1$ to C$_7$ alkylene, C$_5$ to C$_{12}$ cycloalkylene, C$_5$ to C$_{12}$ cycloalkylidene, —O—, —S—, —SO—, —SO$_2$— or —CO—.

X particularly preferably denotes:

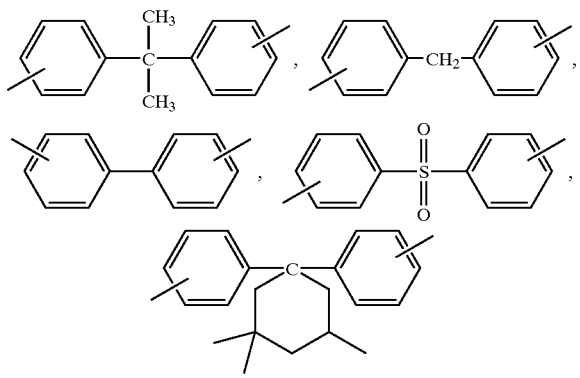

or their chlorinated or brominated derivatives. X is particularly preferably derived from bisphenol A.

The use of oligomeric phosphoric acid esters that are derived from bisphenol A or from analogous compounds is particularly advantageous since the compositions containing these phosphorus compounds exhibit a particularly high stress crack resistance as well as a particularly low tendency to form coatings on the tool during the injection molding processing. Furthermore a particularly high thermal resistance can be achieved with these flame-proofing agents.

The phosphorus compounds according to component D, formula (IV) are known (see for example EP-A 0 363 608, EP-A 0 640 655) or can be produced in a similar manner by known methods (e.g. Ullmanns Enzyklopädie der Technischen Chemie, Vol. 18 (1980), p. 301 et seq. 1979; Houben-Weyl, Methoden der Organischen Chemie, Vol. 12/1, p. 43; Beilstein Vol. 6, p. 177).

The mean q values may be found by determining the composition of the phosphate mixture (molecular weight distribution) by means of suitable methods (gas chromatography (GC), high pressure liquid chromatography (HPLC), gel permeation chromatography (GPC)) from which the mean values for q are then calculated. Phosphonate amines are preferably compounds of the formula (V):

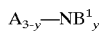  (V)

in which

A denotes a radical of the formula (Va):

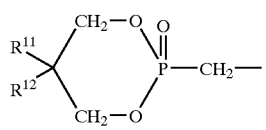  (Va)

or (Vb):

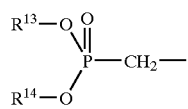  (Vb)

$R^{11}$ and $R^{12}$ independently of one another denote unsubstituted or substituted $C_1$ to $C_{10}$ alkyl or denote unsubstituted or substituted $C_6$ to $C_{10}$ aryl, $R^{13}$ and $R^{14}$ independently of one another denote unsubstituted or substituted $C_1$ to $C_{10}$ alkyl or unsubstituted or substituted $C_5$ to $C_{10}$ aryl, or $R^{13}$ and $R^{14}$ together denote unsubstituted or substituted $C_3$ to $C_{10}$ alkylene, y denotes the numerical values 0, 1 or 2, and $B^1$ independently denotes hydrogen, optionally halogenated $C_2$ to $C_8$ alkyl, unsubstituted or substituted $C_6$ to $C_{10}$ aryl.

$B^1$ preferably independently denotes hydrogen, ethyl, n-propyl or iso-propyl, which may be substituted by halogen, unsubstituted $C_6$ to $C_{10}$ aryl or $C_6$ to $C_{10}$ aryl substituted by $C_1$ to $C_4$ alkyl and/or halogen, in particular phenyl or naphthyl.

Alkyl in $R^{11}$, $R^{12}$, $R^{13}$ and $R^{14}$ independently preferably denotes methyl, ethyl, n-propyl, iso-propyl, n-, iso-, sec.- or tert.-butyl, pentyl or hexyl.

Substituted alkyl in $R^{11}$, $R^{12}$, $R^{13}$ and $R^{14}$ independently preferably denotes $C_1$ to $C_{10}$ alkyl substituted by halogen, in particular singly or doubly substituted methyl, ethyl, n-propyl, iso-propyl, n-, iso-, sec.- or tert.- butyl, pentyl or hexyl.

$C_6$ to $C_{10}$ aryl in $R^{11}$, $R^{12}$, $R^{13}$ and $R^{14}$ independently preferably denotes phenyl, naphthyl or binaphthyl, in particular o-phenyl, o-napthyl, o-binapthyl, which may be substituted by halogen (in general singly, doubly or tripiy substituted).

$R^{13}$ and $R^{14}$ may together with the oxygen atoms to which they are directly bound and the phosphorus atom, form a ring structure.

The following compounds may be mentioned by way of example and preferably: 5,5,5',5',5",5"-hexamethyltris(1,3, 2-dioxaphosphorinane-methane)amino-2,2',2"-trioxide of the formula (Va-1):

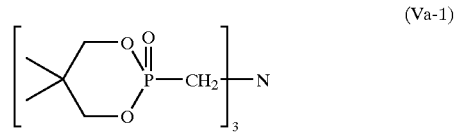  (Va-1)

(experimental product XPM 1000, Solutia Inc., St Louis, USA) 1,3,2-dioxaphos-phorinane-2-methanamine, N-butyl-N[(5,5-dimethyl-1,3,2-dioxaphosphorinan-2-yl)methyl]-5, 5-dimethyl-, P,2-dioxide; 1,3,2-dioxaphosphorinane-2-methanamine, N-[(5,5-dimethyl-1,3,2-dioxaphosphorinan-2-yl)methyl]-5,5-dimethyl-N-phenyl, P,2-dioxide; 1,3,2-dioxaphosphorinane-2-methanamine, N,N-dibutyl-5,5-dimethyl-, 2-oxide, 1,3,2-dioxaphosphorinane-2-methanimine, N[(5,5-dimethyl-1,3,2-dioxa-phosphorinan-2-yl)methyl]-N-ethyl-5,5-dimethyl-, P,2-dioxide, 1,3,2-dioxaphos-phorinane-2-methanamine, N-butyl-N-[(5,5-dichloromethyl-1,3,2-dioxaphos-phorinan-2-yl)-methyl]-5, 5di-chloromethyl-, P,2-dioxide, 1,3,2-dioxaphos-phorinane-2-methanamine, N[(5,5-di-chloromethyl-1,3,2-dioxaphosphorinan-2-yl)-methyl]-5,5-di-chloromethyl-N-phenyl-, P,2-dioxide; 1,3,2-dioxaphosphorinane-2-methanamine, N,N-di-(4-chlorobutyl-5,5-dimethyl-2-oxide; 1,3,2-dioxaphos-phorinane-2-methanimine, N[(5,5-dimethyl-1,3,2-dioxaphosphorinan-2-yl)-methane]-N-(2-chloroethyl)-5,5-di(chloromethyl)-, P,2-dioxide.

Also preferred are: compounds of the formulae (Va-2) or (Va-3):

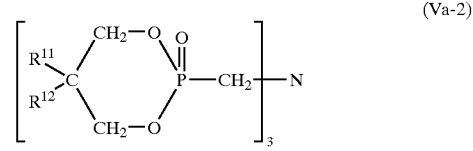  (Va-2)

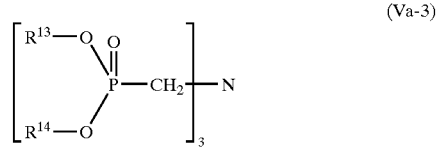  (Va-3)

wherein $R^{11}$, $R^{12}$, $R^{13}$ and $R^{14}$ have the meanings given above.

Particularly preferred are compounds of the formulae (Va-2) and (Va-1)

The production of the phosphonate amines is described for example in U.S. Pat. No. 5,844,028.

Phosphazenes are compounds of the formulae (VIa) and (VIb):

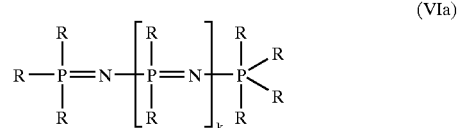  (VIa)

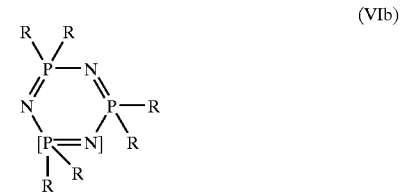  (VIb)

wherein

R in each case is identical or different and denotes amino, $C_1$ to $C_8$ alkyl or $C_1$ to $C_8$ alkoxy in each case optionally halogenated, preferably halogenated with fluorine, $C_5$ to $C_6$ cycloalkyl in each case optionally substituted by alkyl, preferably $C_1$ to $C_4$ alkyl, and/or by halogen, preferably chlorine and/or bromine, $C_6$ to $C_{20}$ aryl, preferably phenyl or naphthyl, $C_6$ to $C_{20}$ aryloxy, preferably phenoxy, naphthyloxy, or $C_7$ to $C_{12}$ aralkyl, preferably phenyl-$C_1$–$C_4$-alkyl, k denotes 0 or a number from 1 to 15, preferably a number from 1 to 10.

By way of example there may be mentioned propoxyphosphazene, phenoxyphosphazene, methylphenoxyphosphazene, aminophosphazene and fluoroalkylphosphazenes. Phenoxyphosphazene is particularly preferred.

The phosphazenes may be used alone or as a mixture. The radical R may always be the same, or two or more radicals in the formulae (Ia) and (1b) may be different. Phosphazenes and their preparation are described for example in EP-A 0 728 811, DE-A 1961668 and WO 97/40092.

The flame-proofing agents may be used individually or in arbitrary mixtures with one another or mixed with other flame-proofing agents and/or flame-proofing synergists.

The component D may be contained in the composition according to the invention in an amount of preferably 0.5 to 30 parts by weight, particularly preferably 1 to 25 parts by weight and most particularly preferably 2 to 20 parts by weight.

Component E

The flame-proofing agent (component D) according to the invention may preferably be used in combination with so-called anti-drip agents, which reduce the tendency of the material to form burning droplets in the event of a fire. Compounds of the classes of substances comprising fluorinated polyolefins, silicones as well as aramide fibers may be mentioned here by way of example. Fluorinated polyolefins are preferably used as anti-drip agents in the compositions according to the invention.

Fluorinated polyolefins are known and are described for example in EP-A 0 640 655. They are marketed for example under the trademark Teflone® 30N by DuPont.

The fluorinated polyolefins may be used in pure form as well as in the form of a coagulated mixture of emulsions of the fluorinated polyolefins with emulsions of the graft polymers (component B) or with an emulsion of a copolymer, preferably based on styrene-acrylonitrile, the fluorinated polyolefin being mixed as an emulsion with an emulsion of the graft polymer or copolymer and then coagulated.

Furthermore the fluorinated polyolefins may be used as a pre-compound with the graft polymer (component B) or with a copolymer, preferably based on styrene/acrylonitrile. The fluorinated polyolefins are mixed as powder with a powder or granules of the graft polymer or copolymer and are compounded in the melt generally at temperatures of 200° to 330° C. in conventional units such as internal kneaders, extruders or double-shaft screw extruders.

The fluorinated polyolefins may also be used in the form of a master batch that is produced by emulsion polymerisation of at least one monoethylenically unsaturated monomer in the presence of an aqueous dispersion of the fluorinated polyolefin. Preferred monomer components are styrene, acrylonitrile and their mixtures. The polymer is employed as a free-flowing powder after precipitation with acid and subsequent drying.

The coagulates, pre-compounds or master batches normally have solids contents of fluorinated polyolefin of 5 to 95 wt. %, preferably 7 to 60 wt. %. In the compositions according to the invention fluorinated polyolefins may be contained in amounts of 0 to 5 parts by weight, preferably up to 2 parts by weight, and particularly preferably 0.1 to 0.5 part by weight.

F. Further Additives

The molding compositions according to the invention may furthermore contain up to 30 parts by weight of at least one of the conventional additives such as lubricants and mould release agents, for example pentaerythritol tetrastearate, nucleating agents, antistatics, stabilisers, fillers and reinforcing agents such as glass fibers or carbon fibers, mica, kaolin, $CaCO_3$ and glass chips, as well as dyes and pigments.

The molding materials (compositions) according to the invention may contain up to 30 parts by weight of a further, optionally synergistically acting flame-proofing agent.

By way of example there may be mentioned as further flame-proofing agents other phosphorus-containing compounds such as monomeric organophosphates, e.g. triphenyl phosphate or organic halogenated compounds such as decabromobisphenyl ether or tetrabromobisphenol A, inorganic halogenated compounds such as ammonium bromide, nitrogen compounds such as melamine, melamine-formaldehyde resins, inorganic hydroxides such as Mg hydroxide or Al hydroxide, inorganic compounds such as antimony oxides, barium metaborate, hexahydroxoantimonate, zirconium oxide, zirconium hydroxide, molybdenum oxide, ammonium molybdate, zinc borate, ammonium borate, barium metaborate, silicon oxide or tin oxide, as well as siloxane compounds.

There are preferably used as flame-proofing (FR) synergists the very finely particulate (nano-scale) inorganic powders described in U.S. Pat. No. 5,849,827, such as TiN, $TiO_2$, $SiO_2$, $SnO_2$, WC, ZnO, boehmite, $ZrO_2$ and $Al_2O_3$. These particles have a mean primary particle size of 0.1 to 1.000 nm, preferably 1 to 500 nm, particularly preferably 1 to 100 nm. Boehmite is particularly preferred.

The sum total of the parts by weight of all components is 100.

Production of the Molding Compositions and Molded Articles

The molding compounds (compositions) according to the invention are produced by mixing the respective constituents in a known manner and melt-compounding and melt-extruding them at temperatures of 200° C. to 300° C. in conventional units such as internal kneaders, extruders and double-shaft screw extruders.

The mixing of the individual constituents may be performed successively as well as simultaneously, and more specifically at about 20° C. (room temperature) as well as at higher temperatures.

The molding compositions according to the invention may be used to produce all types of molded articles. These articles may be produced by injection molding, extrusion and blow molding processes. A further type of processing is the production of molded articles by thermoforming previously fabricated sheets or films.

Examples of such molded articles are films, profiled sections, all types of housing parts, e.g. for domestic appliances such as juice presses, coffee-making machines, mixers; for office equipment such as monitors, flat screens, notebook computers, printers, copiers; sheets, tubing, electrical installation ducting, windows, doors and further profiled sections for the building and construction sector (internal and external applications) as well as electrical and electronics parts such as switches, plugs and sockets.

In particular the molding compositions according to the invention may also be used for example to produce the following molded articles or molded parts: internal installation parts for rail vehicles, boats, aircraft, buses and other vehicles, housings for electrical equipment containing small transformers, housings for equipment for information processing and transmission, housings and casings for medical equipment and devices, massage equipment and housings therefor, children's toys, two-dimensional wall units, housings for safety devices, thermally insulated transporting containers, molded parts for sanitaryware and bathroom fittings, cover gratings for ventilation openings, housings for garden tools.

The following examples serve to illustrate the invention in more details.

EXAMPLES

The components listed in Table 1 and briefly described hereinafter are compounded in a ZSK-25 unit at 240° C. The molded articles are produced in an Arburg 270 E type injection molding machine at 240° C.

Component A

Linear polycarbonate based on bisphenol A with a relative solution viscosity of 1.24 measured in $CH_2Cl_2$ as solvent at 25° C. and at a concentration of 0.5 g/100 ml.

Component B

Graft polymer of 40 parts by weight of a copolymer of styrene and acrylonitrile in a ratio of 73:27 on 60 parts by weight of a particulate crosslinked polybutadiene rubber (mean particle diameter $d_{50}=0.3$ μm) produced by emulsion polymerisation.

Component C

Styrene/acrylonitrile copolymer with a styrene/acrylonitrile weight ratio of 72:28 and an intrinsic viscosity of 0.55 dl/g (measured in dimethylformamide at 20° C.).

Component D

Bisphenol A-based Oligophosphate

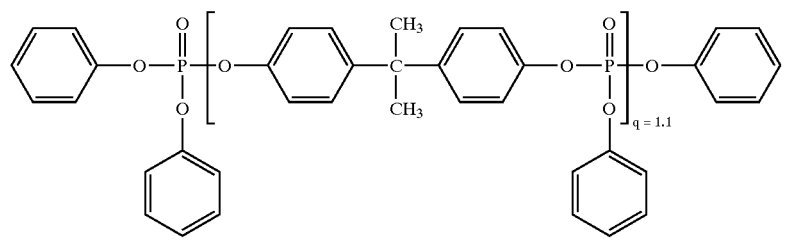

Component E

Tetrafluoroethylene polymer as a coagulated mixture of an SAN graft polymer emulsion according to the aforementioned component B in water and a tetrafluoroethylene polymer emulsion in water. The weight ratio of graft polymer B to the tetrafluoroethylene polymer E in the mixture is 90 wt. % to 10 wt. %. The tetrafluoroethylene polymer emulsion has a solids content of 60 wt. %, and the mean particle diameter is between 0.05 and 0.5 μm. The SAN graft polymer emulsion has a solids content of 34 wt. % and a mean latex particle diameter of $d_{50}=0.3$ μm.

The emulsion of the tetrafluoroethylene polymer (Teflon® 30 N) is mixed with the emulsion of the SAN graft polymer B and stabilised with 1.8 wt. %, referred to the polymer solids, of phenolic antioxidants. The mixture is coagulated at 85° to 95° C. with an aqueous solution Of $MgSO_4$ (Epsom salts) and acetic acid at pH 4 to 5, filtered and washed until practically free from electrolyte, then freed by centrifugation from the major proportion of water, and finally dried at 100° C. to form a powder.

Component F.1

Pentaerythritol tetrastearate (PETS) as mould release agent.

Component F.2

Phosphite stabiliser. ps Component G.1

Talcum: Naintsch® A3 (Naintsch Mineralwerke GmbH, Graz, Austria) with a mean particle diameter of 1.2 μm.

Component G.2

Wollastonite: Nyglos® 5 with a length/thickness ratio of 13/1 and a mean fiber diameter $D_{50}$ of 6.5 μm.

Component G.3

Wollastonite: Nyglose® 8-10013, surface treated wollastonite with a length/thickness ratio of 19/1 and a mean fiber diameter $D_{50}$ of 9.9 μm.

Testing of the Molding Compositions According to the Invention

The Vicat B thermal stability was measured according to DIN 53 460 (ISO 306) on test rods of dimensions 80 mm×10 mm×4 mm.

The notch impact strength $a_k$ is measured according to ISO 180/1 A. The impact strength $A_n$ (without notch) is measured according to ISO 180/1 U.

The modulus of elasticity E is measured in the tensile test according to ISO 527.

In order to determine the flow line strength according to ISO 179/1 eU the impact strength is measured on the flow line of test bodies injection molded on both sides (processing temperature 260° C.) of dimensions 170 mm×10 mm×4 mm.

The fire behavior of the samples is measured according to UL 94 V on rods of thickness 1.2 mm and 1.0 mm.

The stress-crack behavior (ESC behavior) is investigated on rods of dimensions 80 mm×10 mm×4 mm. A mixture of 60 vol. % of toluene and 40 vol. % of isopropanol is used as test medium. The sample bodies are subjected to a preliminary stretching (preliminary stretching in per cent) by means of a circular arc template and are stored in the test medium at room temperature. The stress-crack behavior is evaluated via the crack formation and/or fracture as a function of the preliminary extension (εX) in the test medium.

The MVR (melt volume rate) is measured according to ISO 1133 at 240° C. using a punch load of 5 kg.

A summary of the properties of the compositions according to the invention or the molded articles produced therefrom is given in Table 1.

TABLE

Molding compositions and their properties

|  | V1 (Comp.) | V2 (Comp.) | 1 | 2 |
|---|---|---|---|---|
| Components [parts by weight] | | | | |
| A (polycarbonate) | 65.3 | 63.2 | 63.2 | 63.2 |
| B (graft polymer) | 7.0 | 4.9 | 4.9 | 4.9 |
| C (styrene/acrylonitrile copolymer) | 6.0 | 4.9 | 4.9 | 4.9 |
| D (flame-proofing agent) | 14.6 | 12.8 | 12.8 | 12.8 |
| E (Teflon master batch) | 4.6 | 3.9 | 3.9 | 3.9 |
| F1 (mould release agent) | 0.4 | 0.4 | 0.4 | 0.4 |
| F2 (stabiliser) | 0.1 | 0.1 | 0.1 | 0.1 |
| G1 (talcum) | 2.0 | 9.8 | — | — |
| G2 (wollastonite) | — | — | 9.8 | — |
| G3 (wollastonite) | — | — | — | 9.8 |
| Properties | | | | |
| $a_n$ (flow line strength) [kJ/m$^2$] | 6.9 | 4.0 | 8.5 | 7.5 |
| $a_n$ [kJ/m$^2$] | no fracture | 125 | 131 | 133 |
| $a_k$ [kJ/m$^2$] | 17 | 10 | 10 | 10 |
| Vicat B 120 [° C.] | 95 | 99 | 99 | 99 |
| MVR (240° C./5 kg) [ml/10 min] | 18.6 | 15.3 | 21.3 | 22.1 |
| ESC behavior, fracture at εX [%] | 2.4 | 2.4 | 2.4 | 2.4 |
| UL 94 V at 1.2 mm | V-0 | V-0 | V-0 | V-0 |
| (Afterburning time [s]) | (21) | (15) | (6) | (16) |
| UL 94 V at 1.0 mm | V-0 | V-0 | V-0 | V-0 |
| (Afterburning time [s]) | (40) | (16) | (10) | (19) |
| Modulus of elasticity E [GPa] | 2.8 | 3.9 | 3.6 | 3.6 |

The results in the Table show that an excellent modulus of elasticity as well as an outstanding flow line strength combined with good toughness, flowability, flame resistance and ESC resistance can be achieved by the use of wollastonite having the selected aspect ratio. This combination of properties is not achieved by the use of talcum.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A flame-resistant thermoplastic molding composition comprising:
   A) 5 to 95 parts by weight (pbw) of a polycarbonate selected from the group consisting of aromatic polycarbonate, polyester carbonate and combinations thereof,
   B) 0.5 to 60 pbw of an impact resistance modifier in the form of a graft polymer, that is prepared from, B.1 5 to 95 wt. % of a mixture of vinyl monomers comprising,
      B.1.1 50 to 99 parts by weight of at least one member selected from the group consisting of vinyl aromatic compounds, nuclear-substituted vinyl aromatic compounds and methacrylic acid (C$_1$–C$_8$) alkyl esters, and
      B.1.2 1 to 50 parts by weight of at least one member selected from the groups consisting of vinyl cyanides, (meth)acrylic acid (C$_1$–C$_8$) alkyl esters, anhydrides of unsaturated carboxylic acids and imides of unsaturated carboxylic acids, and
   B.2 5 to 95 wt. % of at least one graft base having, a glass transition temperature of <10° C., a mean particle size (d$_{50}$) of 0.05 to 10 μm, and a gel content of at least 30 wt. %,
   C) 0 to 50 pbw of at least one member selected from the group consisting of vinyl (co)polymer and polyalkylene terephthalate,
   D) 0.5 to 30 pbw of a phosphorus compound, represented by the following formulae:

$$R^1-(O)_n-\overset{\overset{\displaystyle O}{\|}}{\underset{\underset{\displaystyle R^2}{|}}{\underset{\displaystyle (O)_n}{|}}{P}}-\left[O-\underset{(R^5)_m}{\diagdown\!\!\!\bigcirc\!\!\!\diagup}-Y-\underset{(R^6)_m}{\diagdown\!\!\!\bigcirc\!\!\!\diagup}-O-\overset{\overset{\displaystyle O}{\|}}{\underset{\underset{\displaystyle R^3}{|}}{\underset{\displaystyle (O)_n}{|}}{P}}\right]_q-(O)_n-R^4$$

wherein,
R$^1$, R$^2$, R$^3$ and R$^4$ independently of each other denote a member selected from the group consisting of C$_1$ to C$_8$ alkyl, C$_5$ to C$_6$ cycloalkyl, C$_6$ to C$_{10}$ aryl, C$_7$ to C$_{12}$ aralkyl and C$_7$ to C$_{12}$ aralkyl substituted by alkyl,
n independently of each other is 0 or 1,
m independently of each other is 0, 1, 2, 3 or 4,
q is a number between 0.5 and 30, and
R$^5$ and R$^6$ independently of each other denote a member selected from the group consisting of C$_1$ to C$_4$ alkyl, halogen-substituted C$_1$ to C$_4$ alkyl and halogen, and
Y denotes a member selected from the group consisting of C$_1$ to C$_7$ alkylidene, C$_1$ to C$_7$ alkylene, C$_5$ to C$_{12}$ cycloalkylene, C$_5$ to C$_{12}$ cycloalkylidene, —O—, —S—, —SO—, SO$_2$ and —CO—,
   E) 0 to 5 pbw of a fluorinated polyolefin
   (F) 1 to 30 pbw of wollastonite having an aspect ratio greater than 10, and
   (G) up to 30 pbw of at least one additive selected from the group consisting of lubricating agent, mold release agent, nucleating agent, antistatic agent, stabilizer, glass fiber, carbon fibers, mica, kaolin, CaCO$_3$, glass chips, dye and pigment, wherein the total sum of the parts by weight of said molding composition is 100, and said molding composition has a flow line strength of greater than 6 kJ/m$^2$, measured in accordance with ISO 179/1eU.

2. The composition of claim 1 wherein said composition has a modulus of elasticity of at least 3.5 GPa.

3. The composition of claim 1 wherein said composition has a flame resistance value of V-0 as determined in accordance with flame resistance test to UL94V using a test specimen having a wall thickness of ≦1.5 mm.

4. The composition of claim 1, wherein the polycarbonate is present in an amount of 50 to 85 % relative to the weight of the composition.

5. The composition according to of claim 1, wherein the graft base is a member selected from the group consisting of diene, EP(D)M, acrylate and silicone rubbers.

6. The composition of claim 1, wherein the graft polymer is at least one member selected from the group consisting of emulsion ABS and bulk ABS.

7. A molded article comprising the composition of claim 1.

* * * * *